US012809566B2

(12) United States Patent
Bonnet et al.

(10) Patent No.: US 12,809,566 B2
(45) Date of Patent: Nov. 24, 2026

(54) SYSTEM FOR DISPLAYING CRITICAL AND NON-CRITICAL INFORMATION

(71) Applicant: SAFRAN ELECTRONICS & DEFENSE, Paris (FR)

(72) Inventors: Julien Bonnet, Moissy Cramayel (FR); Michael Montoya, Moissy Cramayel (FR); Nicolas Charrier, Moissy Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 134 days.

(21) Appl. No.: 18/843,581

(22) PCT Filed: Mar. 3, 2023

(86) PCT No.: PCT/FR2023/050286
§ 371 (c)(1),
(2) Date: Sep. 3, 2024

(87) PCT Pub. No.: WO2023/166267
PCT Pub. Date: Sep. 7, 2023

(65) Prior Publication Data
US 2025/0173103 A1 May 29, 2025

(30) Foreign Application Priority Data
Mar. 4, 2022 (FR) ....................................... 2201904

(51) Int. Cl.
*B64D 45/00* (2006.01)
*G06F 3/14* (2006.01)
(Continued)

(52) U.S. Cl.
CPC ............... *G06F 3/14* (2013.01); *B64D 45/00* (2013.01); *G09G 5/14* (2013.01);
(Continued)

(58) Field of Classification Search
CPC ....... G09G 5/10–14; G09G 2340/0464; G09G 2340/040712; G09G 2380/12;
(Continued)

(56) References Cited

U.S. PATENT DOCUMENTS 8,831,796 B2 * 9/2014 Samuthirapandian ....................... G01C 23/00 701/4
10,810,808 B2 * 10/2020 True ..................... G07C 5/0816
(Continued)

OTHER PUBLICATIONS

International Search Report as issued in International Patent Application No. PCT/FR2023/050286, dated Jun. 14, 2023.

*Primary Examiner* — Wesner Sajous
(74) *Attorney, Agent, or Firm* — CUSHMAN PARTNERS LLC

(57) ABSTRACT

A system for displaying critical and non-critical information on a screen, includes an electronic computing circuit and an electronic monitoring circuit, the electronic computing circuit being configured to process the critical information to be displayed; construct an image from the non-critical information and incorporate therein the critical information to be displayed; the monitoring circuit being configured to determine critical information expected for the display, the computing circuit is configured to transmit to the monitoring circuit at least one indicator of a critical state or of a non-critical state of the information rendered by each pixel of the image, the electronic monitoring circuit is configured to: extract from the image the critical information received from the indicator, compare the result of a hash function applied to the expected critical information and to the received critical information.

8 Claims, 3 Drawing Sheets

(51) Int. Cl.
*G09G 5/10* (2006.01)
*G09G 5/14* (2006.01)

(52) U.S. Cl.
CPC . *B64D 2045/0085* (2013.01); *G09G 2340/12* (2013.01); *G09G 2380/12* (2013.01)

(58) Field of Classification Search
CPC .... G09G 2360/145; G01C 23/00; G06F 3/14; G06F 3/1423; G06F 3/1454; B64D 45/00; B64D 2045/0085; B64D 43/00; G08G 5/26; G08G 5/80
See application file for complete search history.

(56) References Cited

U.S. PATENT DOCUMENTS

| | | | | |
|---|---|---|---|---|
| 10,901,674 | B2 * | 1/2021 | True | G01C 23/00 |
| 2009/0243893 | A1 * | 10/2009 | Filliatre | H04N 19/467<br>345/441 |
| 2014/0108947 | A1 * | 4/2014 | Chatrenet | G06F 3/0484<br>715/740 |
| 2015/0151838 | A1 * | 6/2015 | Kerns | B64D 25/00<br>345/633 |
| 2015/0277838 | A1 | 10/2015 | Gyllensward | |
| 2015/0333903 | A1 * | 11/2015 | Stocker | G06F 21/64<br>726/22 |
| 2016/0259612 | A1 * | 9/2016 | Monfraix | G06F 3/0416 |

* cited by examiner

SYSTEM FOR DISPLAYING CRITICAL AND NON-CRITICAL INFORMATION

CROSS-REFERENCE TO RELATED APPLICATIONS

This application is the U.S. National Stage of PCT/FR2023/050286, filed Mar. 3, 2023, which in turn claims priority to French patent application number 2201904 filed Mar. 4, 2022. The content of these applications are incorporated herein by reference in their entirety.

TECHNICAL FIELD OF THE INVENTION

The technical field of the invention is that of integrity control of image generation, more particularly for a critical display module, for example in "glass cockpits".

The present invention relates to a system for displaying critical and non-critical information and in particular images comprising such information for display in an aircraft cockpit.

TECHNOLOGICAL BACKGROUND TO THE INVENTION

In order to improve cockpits of flying devices such as helicopters, airplanes and UAVs (unmanned aircraft vehicles), it is contemplated to replace discrete equipment with screens to display some navigation parameters, such as altitude, speed, etc. This change is commonly referred to as the "glass cockpit".

Computers used to generate the images of glass cockpits have to ensure a very high level of integrity, so as not to compromise the mission. Screens are therefore connected to computational units such as central processors CPU (Central Processing Units), graphical processors GPU (Graphical Processing Units) or FPGAs (Field Programmable Gate Arrays), which are responsible for retrieving information to be displayed and transforming it into graphic elements, guaranteeing integrity of the elements displayed.

For this, a critical layer with a transparency component comprises digital symbolic, information as an overlay on the Primary Flight Display, in addition to a background image consisting of chromatic colour information, for example in the Red Green Blue system, also known as the "R G B" layer, or in luminance/chrominance systems such as YUV, YCrCb or YIQ.

Integrity of the information contained in the critical layer with a transparency component is mission-critical. The critical information appears on top of other graphic information in the image and an alpha layer can be used as a mask for the image underneath by simulating transparency, or "alpha blending". The most widespread technique for ensuring this integrity is as follows: data are copied off-screen by a device called COM for "command", in order to be analysed by a device called MON for "monitoring". COM/MON devices are conventionally computers. These graphical computers are cumbersome, heavy and consume energy. They are also known as "non-SWAP optimised" (for "size, weight, and power").

The purpose of projects, and especially of a solution previously provided by the applicant, is to centralise the flight computer interfacing with all the equipment of the aircraft and the graphical generation of the glass cockpit. This means that a dumb display can be connected directly thereto, rather than a graphical computer. In such projects, the computational units (CPU/GPU/FPGA) are reduced to a minimum while guaranteeing the highest level of integrity for the data displayed in the main computer.

Rather than using a central processor CPU and graphical computer GPU pair for image generation, monitored by a second graphical computer GPU or another CPU and GPU pair to check that the image produced is in accordance with the expected image (a usual technique found in graphical computers GPUs), the power of modern central processors CPU is used in order to generate critical navigation parameters, using FPGA(s).

The central processors "CPU" can then:

either emulate the operation of a graphical processor GPU, or use pre-computed images, also known as "sprites", a technique used when graphical processors "GPU" did not exist, or rely on FPGA-based video accelerators.

The resulting image portions, the background of which is transparent, are assembled by the FPGA, for example, before the video stream is sent to the dumb screens.

The integrity control of video generation can be done at several levels:

Either by superimposing the image portions of a generation central processor CPU (COM) and a monitoring central processor CPU (MON) before assembly in the FPGA. The transparent background then serves as a mask. Only illuminated pixels are allowed to be displayed.

Or, after the complete image has been assembled by the generation central processor CPU (COM), extraction of pixels according to the mask generated by the monitoring central processor CPU (MON) has to result in this same mask.

Additionally, as these images are generated on a transparent background, the FPGA can add them as an overlay to a background incoming video stream if required.

This architecture can use FPGAs already present in flight computers, thus reducing size, weight and power consumption of the complete system.

An example of a solution of prior art is represented in FIG. 1. A COM generation processor 110 is connected to a MON monitoring processor 120. The COM generation processor 110 generates an image signal which is transmitted to a dumb screen via the output 104.1 and the output 103. The output 104.1 is also connected to the input 105.1 of the MON monitoring processor 120, in order to transmit the image signal from the COM generation processor 110 to the MON monitoring processor 120. A module 112, for example a software module, makes it possible to generate a critical layer with a transparency component from critical information obtained by the module 111. This critical layer is transmitted to the merge module 115 and to the monitoring processor 120. The MON monitoring processor 120 then applies the critical layer received as a mask to the image signal received by the input 105.1 to obtain a result signal. The module 122 checks, from the result signal, that the critical layer received by the input 105.2 is indeed present in the image signal received at the input 105.1. The result signal has to correspond to the critical layer received by the input 105.2, the other information being masked. This is only one embodiment of the solution, and represents the option 1 mentioned hereinafter.

The solution previously provided by the applicant comprises especially three embodiment options:

Option 1: the critical layer is computed uniquely by the COM generation processor 110 and then transmitted to the MON monitoring processor 120, and it is checked by the MON monitoring processor 120 that it is indeed restored to the display by using it as a mask at the module 121 on the image signal received from the COM generation processor 110, Option 2: the digital critical information is computed uniquely by the COM generation processor 110 and then transmitted to the MON monitoring processor 120, and it is checked by the MON monitoring processor 120 that it is indeed restored to the display by generating a critical layer (not represented) from this critical information and using it as a mask at the module 121 on the image signal received from the COM generation processor 110, Option 3: the complete chain is implemented by the COM generation processor and the MON monitoring processor, including computation of digital information.

Option 1 is the lightest in terms of computations, but only enables errors in merging the critical and colorimetric layers to be identified.

Option 2 covers errors in generating the critical layer in addition to option 1, but does not enable any errors related to the computation of critical information to be identified.

Option 3 covers the entire processing chain, that is, it enables errors in merging the critical and RGB layers, errors in generating the critical layer and errors related to the computation of critical information to be identified. However, this solution requires more FPGA resources or software resources on the MON monitoring processor.

Additionally, in all the options, using the critical layer as a mask requires the mask to be generated, which is a heavy and resource-intensive task. Furthermore, checking the result signal obtained after using the mask requires a pixel-by-pixel comparison of the result signal obtained with the image signal received by the MON monitoring processor 120, which requires identification of the pixels to be compared, and the use of a lot of hardware resources and/or a long processing time.

There is therefore a need to be able to ensure integrity of data generated by at least two central processors CPU, using fewer resources than prior art, while enabling especially errors in merging the critical and colorimetric layers, errors in generating the critical layer, and errors related to the computation of critical information to be detected.

SUMMARY OF THE INVENTION

The invention offers a solution to the problems previously discussed, by enabling a high level of integrity of the data displayed by a screen, this high level of integrity being achieved with a lower consumption of hardware resources and less time than in prior art, and without the need for additional exchanges of information between the two processors COM and MON.

One aspect of the invention thus relates to a system for displaying critical and non-critical information on a screen, the system comprising at least an electronic control circuit and an electronic monitoring circuit, the electronic control circuit being configured to:

process the critical information to be displayed, construct at least one image from the non-critical information and incorporate thereinto the critical information to be displayed in order to form, on a first output of the electronic control circuit, an image signal to be transmitted to the screen, the image constructed by the electronic control circuit comprising a plurality of pixels, each pixel restoring at least a portion of critical or non-critical information;

wherein the electronic control circuit has at least one input connected to a data source, the critical information to be displayed being obtained from the data source, the electronic monitoring circuit having an input connected to said first output and being configured to determine expected critical information for display and to check whether the image signal contains critical information received corresponding to the expected critical information, the electronic control circuit being configured to transmit to the electronic monitoring circuit at least one indicator of a critical state or a non-critical state of the information restored by each pixel of the image constructed, to check whether the image signal contains information corresponding to the expected critical information, the electronic monitoring circuit is configured to:

extract from the image constructed the critical information received from the indicator of a critical state or a non-critical state of the information restored by each pixel of the image constructed, compare a first result of a hash function applied to the expected critical information and a second result of the hash function applied to the critical information received, wherein the electronic control circuit incorporates the critical information to be displayed into a first critical detail layer merged with at least one background detail layer to form the image to be displayed, wherein the electronic monitoring circuit is configured to obtain the expected critical information from the data source or to receive it from the electronic control circuit, and to construct a second critical detail layer into which the expected critical information obtained or received is incorporated, the hash function being applied by the electronic monitoring circuit to the second critical detail layer in order to obtain the first hash result.

By virtue of the invention, it is possible to check, by an electronic monitoring circuit, integrity of images generated by an electronic control circuit more quickly and more simply than in prior art. Indeed, the invention uses a hash function to compare the critical data received with the expected critical data, and therefore does not require the pixels to be compared one by one, or the signals to be synchronised, or the memory to be provided for resynchronisation, with the exception of having to locate at least the image number in order to compare the images with each other. Using a hash function thus makes it possible to compare the critical data received with the expected critical data more quickly and using fewer hardware resources than in prior art.

Furthermore, the invention comprises an indicator of a critical or non-critical state of each pixel of the image generated, transmitted by the electronic control circuit to the electronic monitoring circuit, enabling the electronic monitoring circuit to extract critical information from the image received more quickly and consuming fewer hardware resources than in prior art.

The invention finds a particularly relevant application in aeronautical systems, to meet the need to display critical information in the midst of non-critical and unknown and/or random information, all on a single video stream, in order to be able to guarantee integrity of the critical part of the video stream.

Further to the characteristics just discussed in the previous paragraph, the system according to one aspect of the invention may have one or more additional characteristics from among the following, considered individually or according to any technically possible combinations:

- the electronic control circuit is configured to transmit the indicator of a critical state or a non-critical state of the information restored by each pixel of the image constructed by incorporating into the image constructed, for each pixel of the image, the indicator of a critical state or a non-critical state of the information restored by the pixel by steganography and transmitting the image constructed to the electronic monitoring circuit via the output of the electronic control circuit.
- the electronic control circuit incorporates into the image constructed, for each pixel of the image, the indicator of a critical state or a non-critical state of the information restored by the pixel by giving a predetermined value to at least one bit of the pixel of a colorimetry layer of the image constructed, the bit being chosen from:
  - a least significant bit,
  - a parity bit,
  - a sign bit.
- the hash function is chosen from: SHA-1, MD5 or a cyclic redundancy check CRC function.
- the electronic monitoring circuit is further configured to receive the image to be displayed from the electronic control circuit, to extract the first detail layer from the image to be displayed, and to apply the hash function to the first critical detail layer extracted to obtain the second hash result.
- the expected critical information is received by the electronic monitoring circuit from the electronic control circuit.
- The electronic monitoring circuit has an input connected to said data source, the electronic monitoring circuit being configured to receive critical information from the data source and to process the critical information received to obtain the expected critical information.

Another aspect of the invention relates to an aircraft comprising the display system according to the invention.

The invention is of particular interest for any system requiring a high level of display integrity with limited resources.

The invention and its different applications will be better understood upon reading the following description and upon examining the accompanying figures.

BRIEF DESCRIPTION OF THE FIGURES

The figures are set forth by way of illustrating and in no way limiting purposes of the invention.

DETAILED DESCRIPTION

Unless otherwise specified, a same element appearing in different figures has a single reference.

Figure 1:
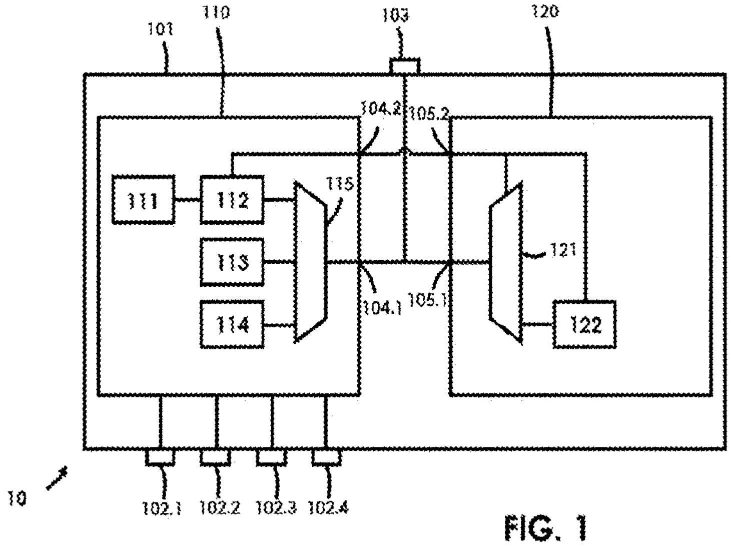
FIG. 1 shows a schematic representation of a display system of prior art.
Figure 2:
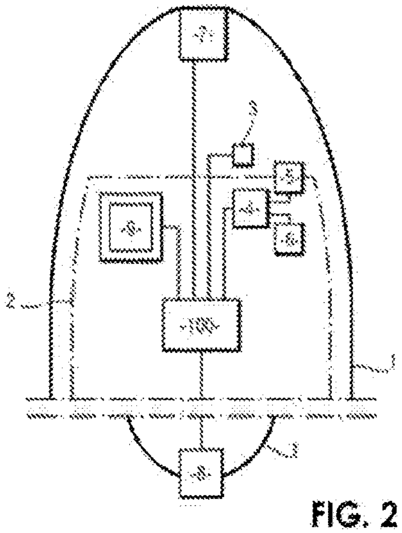
FIG. 2 shows a partial top schematic representation of an aircraft comprising a display system according to the invention.

FIG. 2 shows a partial top schematic representation of an aircraft comprising a display system according to the invention.

With reference to FIG. 2, the aircraft includes a fuselage 1 into which a cockpit 2 is fitted.

The aircraft is fitted with equipment providing information to the pilot to enable them to fly the aircraft and bring it safely from its point of departure to its point of arrival. This information includes:

- critical information enabling the pilot, especially, to take off and land the aircraft and keep it in flight; and
- non-critical information, enabling the pilot, for example, to view his environment.

Thus, in a manner known per se, the aircraft is fitted with a set of external sensors 3 comprising, for example:

- a barometric altimeter 3 which, in conjunction with an external temperature sensor, provides an altitude measurement from the atmospheric pressure surrounding the aircraft;
- Pitot probes to measure the air speed of the aircraft.

For example, the altitude and air speed of the aircraft are among the critical information to be displayed.

The aircraft also carries an electronic navigation unit 4 connected, on the one hand, to an inertial unit 5 including, for example, linear inertial sensors (accelerometers) and angular inertial sensors (gyroscopes or gyrometers) to provide inertial positioning data (attitude, position and speed) and, on the other hand, to a satellite signal receiver 6 arranged to provide satellite data for positioning the aircraft (pseudo-distances) from signals coming from a constellation of satellites belonging to a global navigation satellite system (or GNSS; such as GPS, GALILEO, GLONASS, BEIDOU, etc.). The electronic navigation unit 4, which is known per se, can determine, for example, by hybridising inertial and satellite positioning data, an aircraft speed as well as an aircraft position plotted on a map of the zone over which the aircraft flies. The attitude, provided by the inertial unit 5, is part of the critical information to be displayed in the example in FIG. 2.

A front camera 7 is mounted at the front of the fuselage 1 to provide, in the form of a video stream, images of the environment in front of the aircraft. These images form part of the non-critical information to be displayed in the example in FIG. 2.

A rear camera 8 is mounted at the rear of the fuselage 1 to provide, in the form of a video stream, images of the environment at the rear of the aircraft. These images form part of the non-critical information to be displayed in the example in FIG. 2.

A display screen 9 connected to a display system generally designated 100 is mounted into the cockpit 2 to present critical and non-critical information to the pilot. Of course, the amount of information to be displayed could be different with more or less critical information and/or more or less non-critical information: this is an example to simply explain the invention.

Figure 3:
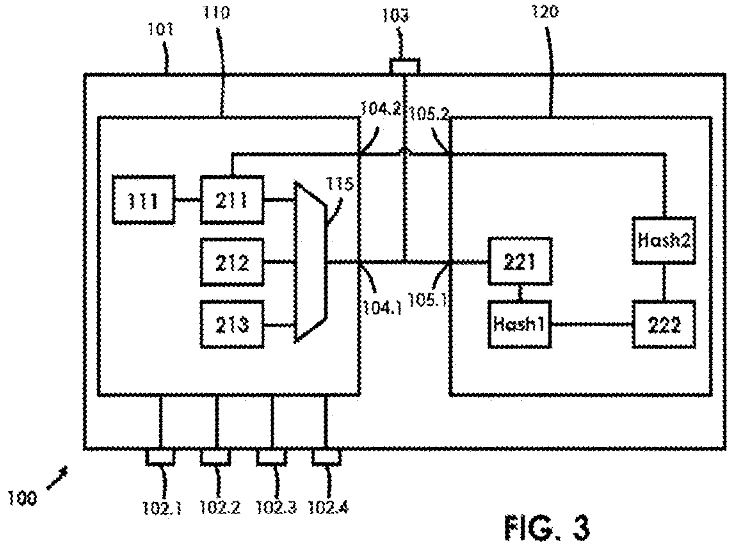
FIG. 3 shows a schematic representation of a first embodiment of a display system according to the invention.

FIG. 3 shows a schematic representation of a display system according to a first embodiment of the invention.

The display system 100 according to the invention comprises connectors respectively defining at least a first input 102.1 connected to the barometric altimeter 3 to receive the altitude, a second input 102.2 connected to the electronic navigation unit 4 to receive the speed, a third input 102.3 connected to the front camera 7 to receive a video stream representing the front environment of the aircraft, a fourth input 102.4 connected to the rear camera 8 to receive a video stream representing the rear environment of the aircraft, and an output 103 to provide the electric signal corresponding to the images to be displayed. The connectors forming the inputs 102.1 to 102.4 and the output 103 enable electrical connection of the display system 100 to the equipment to which it is to be connected. The invention covers any display system 100 comprising another number of inputs and outputs. The invention is not limited to the inputs 102.1 to 102.4 connected to the data sources mentioned previously, but covers any number of inputs connected to any data source, for example a database or one or more sensors or sensing devices.

The system 100 comprises at least an electronic control circuit 110 (commonly referred to as COM) and an electronic monitoring circuit 120 (commonly referred to as MON) connected to the electronic control circuit 110. Each of these electronic circuits 110, 120 comprises at least one processor and is connected to at least one memory configured to store instructions, which, when executed by the processor, cause the processor to implement the invention. Thus, by "a circuit is configured to carry out an action", it is meant the fact that it is connected to a memory comprising instructions specific to this circuit, these instructions enabling, when executed by the processor, the processor of the circuit to carry out the action. In one embodiment, the electronic control circuit 110 and the electronic monitoring circuit 120 are included in a same box 101.

The instructions specific to the electronic control circuit 110 are arranged so that the electronic control circuit 110 forms a central processing unit (commonly referred to as a CPU) which processes (prepares and formats) critical information to be displayed, constructs an image from non-critical information, incorporates the critical information processed thereinto, in order to form, on an output of the electronic control circuit 110, an image signal to be transmitted to the display screen 8, and transmits to the electronic monitoring circuit 120 an indicator of a critical state or a non-critical state of the information restored by each pixel of the image constructed.

Instructions specific to the electronic monitoring circuit 120, when implemented by it, lead the electronic monitoring circuit 120 to determine expected critical information for display, extract from the image constructed the critical information received from the indicator received, implement a hash function on the expected critical information and on the critical information received extracted, and compare the results of the hash function applied to the critical information received extracted and to the expected critical information.

The different functions and tasks performed by the electronic control circuit 110 and the electronic monitoring circuit 120 will now be described, with reference to FIGS. 3 to 5, in three embodiments.

The electronic control circuit 110 performs the same functions and tasks in all three embodiments. The electronic control circuit 110 receives critical information, for example from the inputs 102.1, 102.2. The program executed by the electronic control circuit 110 comprises a program part 111 arranged to group together the critical information and put it in the form in which it will be displayed, thus obtaining the critical information to be displayed.

A program part 211 executed by the electronic control circuit 110 then incorporates the critical information to be displayed into a so-called critical detail layer. This critical detail layer comprises each pixel of critical information to be displayed on the screen 9. Furthermore, the program part 211 executed by the electronic control circuit 110 incorporates, for each pixel of critical information, an indicator that the information restored by the pixel is critical information. This indicator is incorporated into the critical detail layer by giving a predetermined value to a bit of each pixel of critical information in the critical detail layer. Indeed, each pixel in the critical detail layer is coded in bits or bytes. For example, the least significant bit (LSB) of each pixel of critical information in the critical detail layer can be set to a predetermined value. The invention preferably uses the least significant bit to have the least impact on the image. The predetermined value is, for example, "0". The invention covers any incorporation of the indicator of a critical state or a non-critical state of the information restored by each pixel into the critical detail layer. Such incorporation is called "steganography". Thus, according to the invention, such an incorporation can be carried out into the value of the least significant bit, into the value of the parity bit, into the value of the sign bit or on any other component of the critical detail layer. Such an incorporation can also be in one bit of each colour of the colorimetry layer, or a 3-bit code distributed over each RGB colour component, or luminance-chrominance (YCrCb), or any possible combination. It is also possible to incorporate the information into several bits per colour, or only on the chrominance. Implementation depends mainly on the type of image to be restored.

The electronic control circuit 110 receives the video stream from the front camera 7 via the input 102.3 and the video stream from the rear camera 8 via the input 102.4. The electronic control circuit 110 can receive one or more other video streams via at least one of the inputs 102.3 and 102.4. The program executed by the electronic control circuit 110 comprises program parts 212, 213 arranged to display the two video streams in two windows of a background detail layer of the image (conventionally called the colorimetry layer). Furthermore, the program parts 212 executed by the electronic control circuit 110 can be configured to incorporate, for each pixel of the two video streams, an indicator that the information restored by the pixel is non-critical information. This indicator is then incorporated into the colorimetry layer of each stream by giving a predetermined non-critical value to one bit of each pixel of non-critical information in the colorimetry layer. Indeed, each pixel in the colorimetry layer of each stream is coded in bits or bytes. For example, the least significant bit (LSB) of each pixel of non-critical information in the colorimetry layer of each stream can be set to a predetermined non-critical value. The invention preferably uses the least significant bit to have the least impact on the image. The predetermined non-critical value is, for example, "1". The invention covers any incorporation of the indicator of a critical state or a non-critical state of the information restored by each pixel in the colorimetry layer. Thus, according to the invention, such an incorporation can be carried out into the value of the least significant bit, into the value of the parity bit, into the value of the sign bit or on any other component of the colorimetry layer. Such an incorporation can also be in one bit of each colour of the colorimetry layer, or a 3-bit code distributed over each RGB colour component, or luminance-chrominance (YCrCb), or any possible combination. It is also possible to incorporate the information into several bits per colour, or only on the chrominance. Implementation depends mainly on the type of image to be restored.

In an alternative, the indicator of a critical state or a non-critical state of the information restored for each pixel of the video streams can be included in a dedicated critical detail layer comprising, for each pixel, a predetermined value indicating a critical state or a predetermined value indicating a non-critical state.

A program part 115 then merges the background detail layer with the critical detail layer so that the latter appears as an overlay on the background detail layer in order to obtain a resulting image. Thus, the indicator of each pixel of the resulting image takes a predetermined value depending on the critical or non-critical state of the information represented by the pixel. The indicator of a critical state or a non-critical state of the information restored by each pixel is thus incorporated into the final image, and in particular into the colorimetry layer of the final image, by steganography. For example, for each pixel of the resulting image, the least significant bit takes the value "0" when the information represented by the pixel is critical and the value "1" when the information represented by the pixel is non-critical. The electronic control circuit 110 provides an image signal (more precisely a video stream) via an output 104.1 connected to the output 103 to which the screen 9 is connected. In an alternative, the background detail layer of the resulting image of the image signal is generated randomly, for example by displaying a plain colour, for example black.

In practice, the electronic control circuit 110 can be programmed to emulate the operation of a graphical processing unit (commonly referred to as a GPU). The emulation program then takes charge of making the detail layers, incorporating the indicator into the detail layers, and merging them. Such emulation programs are currently available on the market and can be configured and used to implement the invention.

Alternatively, the electronic control circuit 110 can be programmed to use pre-computed images.

Alternatively, the electronic control circuit 110 may comprise at least one FPGA circuit forming a video accelerator arranged to merge the layers of detail together. The FPGA circuit is then preferably programmed to ensure at least some of the processing functions traditionally performed by a GPU. Aircraft flight computers contain FPGA circuits that can be used for this purpose.

In all three embodiments, the output 104.1 of the electronic control circuit 110 is connected to an input 105.1 of the electronic monitoring circuit 120, enabling the electronic control circuit 110 to transmit the image signal to the electronic monitoring circuit 120.

According to the first embodiment illustrated in FIG. 3, the electronic control circuit 110 comprises an output 104.2 connected to an input 105.2 of the electronic monitoring circuit 120 enabling the electronic control circuit 110 to transmit the critical detail layer to the electronic monitoring circuit 120. The critical detail layer comprises the critical information considered to be expected by the electronic monitoring unit 120. This link comprising the input 105.2 and the output 104.2 is a high-speed link because the critical detail layer can include critical information per pixel in the form of an image.

The electronic monitoring circuit 120 executes a program, a part Hash2 of which is arranged to apply a hash function to the critical detail layer comprising the critical information, considered to be expected because it is received directly from the electronic control circuit 110. The hash function used on the critical detail layer makes it possible to obtain a first hash result. In an alternative, the hash function is applied several times to several parts of the critical detail layer, in order to obtain a plurality of first hash results which are then compared with a plurality of second hash results.

The hash function used at the program part Hash2 is a function selected from: a cyclic redundancy check, an MD5 function, an SHA1 function, or any other hash function that allows a large amount of data to be transformed into a smaller amount of data. The hash function used in the invention preferably has a high Levenshtein distance when used on data of the same length, that is, two hash results of two different data of the same length have to be sufficiently different.

A program part 221 executed by the electronic monitoring circuit 120 is arranged to extract the critical detail layer from the image constructed that is, to extract the critical data pixels from the image received constructed. This is done using the indicator of a critical state or a non-critical state of the information restored by each pixel of the image constructed received. As previously indicated, this indicator is, for example, a value of the least significant bit of each pixel of the colorimetry layer of the image constructed received. As previously indicated, the invention is not limited to this way of transmitting the indicator to the electronic monitoring circuit 120. The critical detail layer extracted comprises the critical information extracted received by the electronic monitoring unit 120.

The electronic monitoring circuit 120 executes a program, a part Hash1 of which is arranged to apply a hash function to the critical detail layer extracted comprising the critical information extracted as extracted from the image constructed received from the electronic control circuit 110. The hash function used on the critical detail layer is identical to the hash function used by the program part Hash2 and makes it possible to obtain a second hash result. In an alternative, and when this has also been implemented by the program part Hash2, the hash function is applied several times to several parts of the critical detail layer extracted, in order to obtain a plurality of hash results which are subsequently compared with the plurality of first hash results.

A program part 222 executed by the electronic monitoring circuit 120 checks that the first hash result and the second hash result are equal or that the plurality of first hash results is equal to the plurality of second hash results. If so, the critical information is correctly displayed. If not, the critical information has been altered either during merging or during transfer between the control unit 110 and the monitoring unit 120, or there has been a failure in the monitoring unit 120: the electronic monitoring unit 120 issues an alert informing the pilot that they cannot take account of the critical information displayed.

Figure 4:
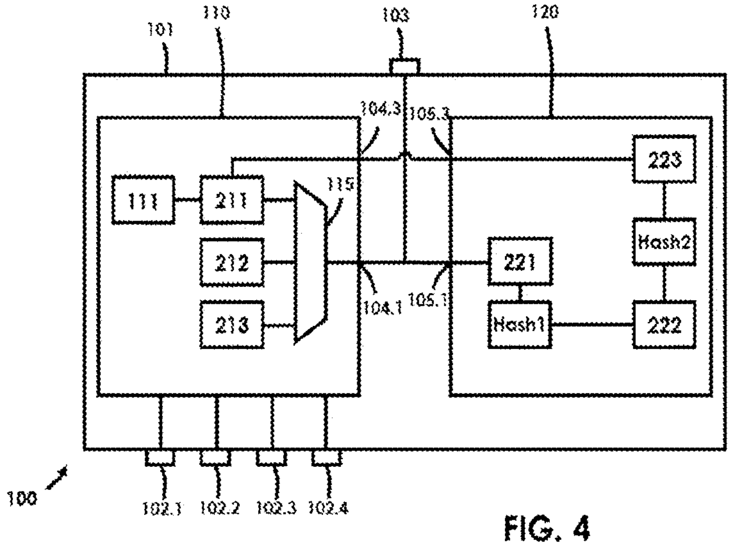
FIG. 4 shows a schematic representation of a second embodiment of a display system according to the invention.
Figure 5:
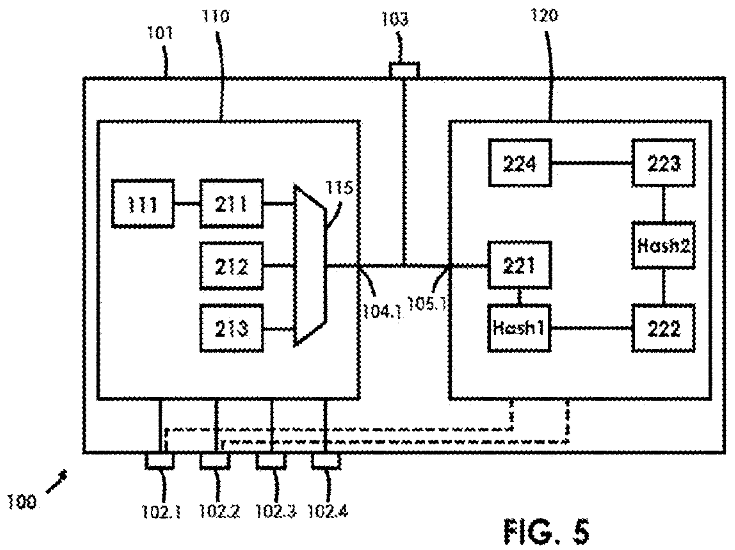
FIG. 5 shows a schematic representation of a third embodiment of a display system according to the invention.

In the second and third embodiments, schematically represented in FIGS. 4 and 5 respectively, the electronic monitoring circuit 120 is configured to develop, in a program part 223, a second critical detail layer into which the expected critical information is incorporated. For this, in the embodiment shown in FIG. 4, the electronic monitoring circuit 120 is configured to receive the expected critical information from the electronic control circuit 110 and, in the embodiment shown in FIG. 5, the electronic monitoring circuit 120 is configured to obtain the expected critical information from the data source via the inputs 102.1 to 102.4. In these two embodiments of the invention, the hash function Hash2 is applied by the electronic monitoring circuit 120 to the second critical detail layer to obtain the first hash result.

According to the second embodiment illustrated in FIG. 4, the electronic control circuit 110 comprises an output 104.3 connected to an input 105.3 of the electronic monitoring circuit 120 enabling the electronic control circuit 110 to transmit, to the electronic monitoring circuit 120, the critical information processed which will be considered as being the expected critical information by the electronic monitoring circuit 120. This link comprising the input 105.3 and the output 104.3 is preferably a low-speed link because only critical information is transmitted, and this critical information is not in the form of an image. There is therefore no need for a high-speed link.

The program executed by the electronic monitoring unit 120 comprises a program part 223 arranged to create the critical detail layer incorporating the critical information processed received by the input 105.2 and transmit it to the program part Hash2 which will use it to obtain the first hash result. The program part 222 executed by the electronic monitoring circuit 120 checks that the first hash result and the second hash result are equal. If so, the critical information is correctly displayed. If not, the critical information has been altered, either during the creation of the critical detail layer by the electronic control unit 110, or during the merge, or during the transfer between the control unit 110 and the monitoring unit 120, or there is a failure in the monitoring unit 120: the electronic monitoring unit 120 issues an alert informing the pilot that they cannot take account of the critical information displayed.

According to the third embodiment illustrated in FIG. 5, the electronic monitoring circuit 120 is connected to the inputs 102.1, 102.2 to receive critical information directly.

The program executed by the electronic monitoring unit 120 comprises a program part 224 arranged to process, like the program part 111, the critical information from that received directly from the inputs 102.1, 102.2 and thus obtain the expected critical information. The critical information thus processed is theoretically identical to that produced by the electronic control circuit 110 and is transmitted to the program part 223 which creates the critical detail layer incorporating the critical information processed by the program part 124. The critical detail layer created by the program part 223 is transmitted to the program part Hash2 which uses it to obtain at least a first hash result. The program part 222 executed by the electronic monitoring circuit 120 checks that the first hash result and the second hash result are equal. If so, the critical information is correctly displayed. If not, the critical information has been altered, either during processing by the electronic control unit 110, or during creation of the detail layer a by the electronic control unit 110, or during merging, or during transfer between the control unit 110 and the monitoring unit 120, or there is a failure in the monitoring unit 120: the electronic monitoring unit 120 issues an alert informing the pilot that it cannot take account of the critical information displayed.

Of course, the invention is not limited to the embodiment described but encompasses any alternative falling within the scope of the invention as defined by the claims. In an alternative, the computation Hash1 by the hash function can be carried out by the electronic control circuit 110. The result of the hash function is then transmitted from the electronic control circuit 110 to the electronic monitoring circuit 120. In another alternative compatible with the previous alternative, the merge module 115 may be included in another electronic circuit not represented, merging of the critical and background layers then being carried out in an electronic circuit different from that which generates the layers.

In particular, the system may have a different structure to that described and, for example, comprise several control and/or monitoring units. The monitoring unit may comprise at least one voter (autonomous selector of the control unit providing an image with critical information considered to be correct) or at least one relay (driven by another piece of equipment or a human).

For example, the electronic control circuit 110 and the electronic monitoring circuit 120 may belong to a same electronic circuit. They may each be formed by one or more cores of a same processor. The electronic circuits 110 and 120 may form part of the same flight computer.

In an alternative, the indicator of a critical state or a non-critical state of the information restored by each pixel of the image constructed may be included in a dedicated layer comprising, for each pixel, a predetermined value indicating a critical state or a predetermined value indicating a non-critical state. This layer is then merged with the critical detail layer and the colorimetry layers, and sent in the form of an image signal via the output 104.1.

In order to reduce computation time, an alternative comprises segmenting the image over the controlled display zone as a replacement of or in addition to incorporating the indicator into a layer of the image.

Alternatively, the inputs 102 can be gathered in a separate box (interface module) connected by an electrical connection cable to the box 101 when it contains the control 110 and monitoring 120 circuits.

The invention can be implemented using one or more processors with one or more cores and/or one or more FPGA circuits incorporating one or more processors.

Critical and non-critical information can be provided by means other than those described, for example a radio altimeter for altitude.

Critical information may comprise information other than that mentioned.

Non-critical information can comprise operating parameters for the aircraft, meteorological data, images in the visible or infrared range, radar data, etc.

The non-critical information may further comprise ground following images. The aircraft then comprises:

an altitude database containing the coordinates of the points in a gridding of the territory over which the aircraft flies and altitudes associated with each point in this gridding, a photographic database containing coordinates of the points of this same gridding of the territory over which the aircraft flies and aerial photographs associated with these points.

The invention is applicable to any type of aircraft, with fixed or rotary wing, manned or unmanned, atmospheric or space craft, etc. The invention is also applicable to naval or land vehicles.

The invention claimed is:

1. A system for displaying critical and non-critical information on a screen, the system comprising at least an electronic control circuit and an electronic monitoring circuit, the electronic control circuit being configured to:

process the critical information to be displayed, construct at least one image from the non-critical information and incorporate therein the critical information to be displayed in order to form, on a first output of the electronic control circuit, an image signal to be transmitted to the screen, the image constructed by the electronic control circuit comprising a plurality of pixels, each pixel restoring at least part of critical or non-critical information;

wherein the electronic control circuit has at least one input connected to a data source, the critical information to be displayed being obtained from the data source, the electronic monitoring circuit having an input connected to said first output and being configured to determine expected critical information for display and to check whether the image signal contains critical information received corresponding to the expected critical information, wherein:

the electronic control circuit is configured to transmit to the electronic monitoring circuit at least one indicator of a critical state or a non-critical state of the information restored by each pixel of the image constructed, to check whether the image signal contains information corresponding to the expected critical information, the electronic monitoring circuit is configured to:

extract from the image constructed the critical information received from the indicator of a critical state or a non-critical state of the information restored by each pixel of the image constructed, compare a first result of a hash function applied to the expected critical information and a second result of the hash function applied to the critical information received, wherein the electronic control circuit incorporates the critical information to be displayed into a first critical detail layer merged with at least one background detail layer to form the image to be displayed, wherein the electronic monitoring circuit is configured to obtain the expected critical information from the data source or to receive it from the electronic control circuit, and to develop a second critical detail layer in which the expected critical information obtained or received is incorporated, the hash function being applied by the electronic monitoring circuit to the second critical detail layer in order to obtain the first hash result.

2. The system according to claim 1, wherein the electronic control circuit is configured to transmit the indicator of a critical state or a non-critical state of the information restored by each pixel of the image constructed by incorporating into the image constructed, for each pixel of the image, the indicator of a critical state or a non-critical state of the information restored by the pixel by steganography and transmitting the image constructed to the electronic monitoring circuit via the output of the electronic control circuit.

3. The system according to claim 2, wherein the electronic control circuit incorporates into the image constructed, for each pixel of the image, the indicator of a critical state or a non-critical state of the information restored by the pixel by giving a predetermined value to at least one bit of the pixel of a colorimetry layer of the image constructed, the bit being chosen from:

a least significant bit, a parity bit, a sign bit.

4. The system according to claim 1, wherein the hash function is selected from: SHA-1, MD5 or a cyclic redundancy check CRC function.

5. The system according to claim 1, wherein the electronic monitoring circuit is further configured to receive, from the electronic control circuit, the image to be displayed, to extract from the image to be displayed the first detail layer, and to apply the hash function to the first critical detail layer extracted to obtain the second hash result.

6. The system according to claim 1, wherein the expected critical information is received by the electronic monitoring circuit from the electronic control circuit.

7. The system according to claim 1, wherein the electronic monitoring circuit has an input connected to said data source, wherein the electronic monitoring circuit is configured to receive critical information from the data source and to process the critical information received to obtain the expected critical information.

8. An aircraft equipped with at least one screen to which the output of a display system according to claim 1 is connected.

* * * * *